United States Patent
Downie

(10) Patent No.: US 10,119,386 B2
(45) Date of Patent: Nov. 6, 2018

(54) DOWNHOLE TURBINE TACHOMETER

(71) Applicant: Halliburton Energy Services, Inc., Houston, TX (US)

(72) Inventor: Andrew McPherson Downie, Central Scotland (GB)

(73) Assignee: Halliburton Energy Services, Inc., Houston, TX (US)

( * ) Notice: Subject to any disclaimer, the term of this patent is extended or adjusted under 35 U.S.C. 154(b) by 201 days.

(21) Appl. No.: 15/104,834

(22) PCT Filed: Jan. 29, 2014

(86) PCT No.: PCT/US2014/013485
§ 371 (c)(1),
(2) Date: Jun. 15, 2016

(87) PCT Pub. No.: WO2015/116041
PCT Pub. Date: Aug. 6, 2015

(65) Prior Publication Data
US 2016/0319656 A1 Nov. 3, 2016

(51) Int. Cl.
*E21B 47/18* (2012.01)
*G01P 3/26* (2006.01)
(Continued)

(52) U.S. Cl.
CPC .............. *E21B 47/00* (2013.01); *E21B 4/02* (2013.01); *E21B 21/08* (2013.01); *E21B 47/06* (2013.01);
(Continued)

(58) Field of Classification Search
CPC ........ E21B 47/00; E21B 47/18; E21B 47/122; E21B 47/06; E21B 47/182; E21B 21/08;
(Continued)

(56) References Cited

U.S. PATENT DOCUMENTS 2,958,821 A 11/1960 Webb
3,065,416 A 11/1962 Jeter
(Continued)

FOREIGN PATENT DOCUMENTS

DE 1102612 B 3/1961
FR 1182550 A 6/1959
(Continued)

OTHER PUBLICATIONS

McDonald et al., TR81-14; Development of Turbodrill Tachometer—Final Report; U.S. Department of Energy—Morgantown Energy Technology Center (Year: 1981).*
(Continued)

*Primary Examiner* — George S Gray
(74) *Attorney, Agent, or Firm* — Alan Bryson; Tumey L.L.P.

(57) ABSTRACT

A drilling system can include a mud motor arranged in a drill string and a turbine shaft operatively coupled to a drill bit. The drilling system can also include a plurality of turbine stages axially arranged along a portion of the turbine shaft, a measure-while-drilling (MWD) tool operatively and communicably coupled to the mud motor, and a pressure sensor configured to detect pressure pulses generated by the mud motor and generate data signals corresponding to the pressure pulses. Further, the drilling system can include an electronics module communicably coupled to the pressure sensor and configured to process the data signals and thereby calculate a rotational speed of the mud motor. Furthermore, the drilling system can include a communications module communicably coupled to the electronics module and configured to transmit signals indicative of the rotational speed of the mud motor to a surface location.

17 Claims, 6 Drawing Sheets

(51) Int. Cl.
| | |
|---|---|
| *E21B 47/00* | (2012.01) |
| *E21B 4/02* | (2006.01) |
| *F03B 13/02* | (2006.01) |
| *G01P 3/48* | (2006.01) |
| *G01P 3/481* | (2006.01) |
| *E21B 21/08* | (2006.01) |
| *E21B 47/06* | (2012.01) |
| *E21B 47/12* | (2012.01) |

(52) U.S. Cl.
CPC ............ *E21B 47/122* (2013.01); *E21B 47/18* (2013.01); *E21B 47/182* (2013.01); *F03B 13/02* (2013.01); *G01P 3/263* (2013.01); *G01P 3/48* (2013.01); *G01P 3/481* (2013.01)

(58) Field of Classification Search
CPC ... E21B 4/02; E21B 4/14; E21B 25/16; E21B 34/06; E21B 7/068; E21B 10/42; E21B 10/62; G01P 3/263; G01P 3/481; G01P 3/48; G01P 3/26; G01P 3/52; F03B 13/02; F04D 29/32; F04D 13/10; F04C 11/00; G01V 1/00
See application file for complete search history.

(56) References Cited

U.S. PATENT DOCUMENTS

| | | | |
|---|---|---|---|
| 4,147,223 | A | 4/1979 | Patton |
| 4,545,241 | A | 10/1985 | Alder |
| 4,676,716 | A | 6/1987 | Brudny-Chelyadinov et al. |
| 4,698,794 | A | 10/1987 | Kruger et al. |
| 4,785,300 | A | 11/1988 | Chin et al. |
| 4,941,951 | A | 7/1990 | Sheppard et al. |
| 4,958,125 | A | 9/1990 | Jardine et al. |
| 5,448,227 | A | 9/1995 | Orban et al. |
| 6,047,784 | A * | 4/2000 | Dorel ............... E21B 7/068 175/61 |
| 6,142,228 | A | 11/2000 | Jogi et al. |
| 6,527,513 | B1 | 3/2003 | Van Drentham-Susman et al. |
| 7,013,989 | B2 | 3/2006 | Hammond et al. |
| 7,448,455 | B2 | 11/2008 | Natanael et al. |
| 2004/0112595 | A1* | 6/2004 | Bostick, III et al. ... E21B 21/08 166/250.01 |
| 2009/0229883 | A1 | 9/2009 | Hall et al. |
| 2010/0032210 | A1 | 2/2010 | Teodorescu et al. |
| 2010/0230113 | A1* | 9/2010 | Hutin ................... E21B 47/182 166/373 |
| 2011/0266062 | A1* | 11/2011 | Shuman ................. E21B 7/046 175/74 |
| 2013/0222149 | A1* | 8/2013 | Li ........................... G01V 3/18 340/854.3 |
| 2014/0069628 | A1* | 3/2014 | McCann ................. E21B 4/04 166/66.4 |

FOREIGN PATENT DOCUMENTS

| | | |
|---|---|---|
| WO | WO-99/58984 A1 | 11/1999 |
| WO | 2015/116041 A1 | 8/2015 |

OTHER PUBLICATIONS

Canadian Office Action from Canadian Patent Application No. 2,934,449, dated Jul. 5, 2017 (5 pages.
Extended European Search Report from European Patent Application No. 14881039.3, dated Jun. 9, 2017, 7 pages.
Neudecker et al., High-Temperature Directional Drilling Turbodrill, Los Alamos National Laboratory, DE82 009712, 1982.
Bruijn et al., "Use of MWD for Turbodrill Performance Optimization as a Means to Improve ROP," SPE Drilling Engineering, 1986.
Liang et al., "Processing of Rurbodrill Rotating Speed Signal with an Adaptive Noise Canceller," SPE 20445, Society of Petroleum Engineers Inc., 1990.
International Search Report and Written Opinion for PCT/US2014/013485 dated Oct. 30, 2014.
Canadian Office Action from Canadian Patent Application No. 2,934,449, dated Apr. 20, 2018, 4 pages.

* cited by examiner

DOWNHOLE TURBINE TACHOMETER

BACKGROUND

The present disclosure is related to drilling boreholes and, more particularly, to measuring the rotational speed of a drill bit during operation.

In the oil and gas industry, drilling fluid is often used to hydraulically power downhole drilling motors or "mud motors" in order to rotate a drill bit. One type of mud motor is a turbodrill, which includes a turbine that has multiple rotor/stator stages configured to allow the circulating drilling fluid to pass through it. The drilling fluid acts on the rotors, which causes a turbine shaft to rotate and thereby rotate and drive a drill bit connected to the distal end of the turbine shaft. The resulting rotational speed of the drill bit is dependent on the torque from the drill bit and the flow rate of the drilling fluid through the turbine.

Operation of a turbodrill requires the knowledge and expertise of a skilled operator to determine, from the limited surface parameters available, what is happening downhole at the drill bit. While turbodrills are quite efficient and able to drill straight wellbores, in order to be effective, the turbine must be operated within a narrow range of rotational speeds for optimum power output. When the turbine strays from a preferred range of rotational speeds, the efficiency of a turbodrill can rapidly decline.

The available and measurable surface parameters are often not direct indicators of turbine rotation and indeed are sometimes masked by fluctuations in pressure, torque, and weight on bit, all of which can occur because of the various interactions in the wellbore. Accurate indication of rotational speed provides a driller or well operator with important feedback on what is happening at the drill bit, such as knowing how fast the drill bit is rotating, which can lead to improved drilling optimization. Accurate indication of rotational speed also reduces lost rig time in deciding if the drill bit is actually on bottom or whether it is over speeding. Knowing the real-time rotational speed of the drill bit also informs the driller or well operator when the drill bit is sticking on the formation, which could result in extremely high costs to a well operator if a fishing operation is required to retrieve a stuck drill bit. An ability to recognize that the drill bit has stopped will help the driller take appropriate actions to avoid these situations and thereby result in significant savings.

Conventionally, drill bit rotational speed in turbodrills has been monitored at surface locations by measuring the frequency or magnitude of pressure pulses propagated through the entire wellbore from the turbine. In deeper and more complex wells, however, surface detection is extremely limited because of signal attenuation and surface pump noise, each of which serves to complicate and limit the capabilities of using pressure waves to detect downhole rotational speed. In such applications, there is often uncertainty about weight transfer to the drill bit or whether the drill bit is actually biting or otherwise running away on bottom. This uncertainty leads to lost time and hence reduced gross rate of penetration.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to drilling boreholes and, more particularly, to measuring the rotational speed of a drill bit during operation.

Disclosed is a system and method for detecting and measuring the rotational speed of a downhole motor, such as a turbodrill that incorporates a turbine. This is done by measuring the magnitude and frequency of pressure pulses generated by the partial blockage created as turbine blades pass over flow passages defined between angularly adjacent stator blades. The resulting pressure pulses are detectable by a pressure sensor fitted in a measure-while-drilling tool. The pressure pulses are a function of the rotational speed of the downhole motor. More particularly, the frequency of the pressure pulses may be a direct function of the rotational speed and the number of flow passages covered and uncovered in each rotation of the downhole motor. After processing the detected pressure pulses using appropriate software, the data may be transmitted to the surface using conventional downhole transmission methods.

Figure 1:
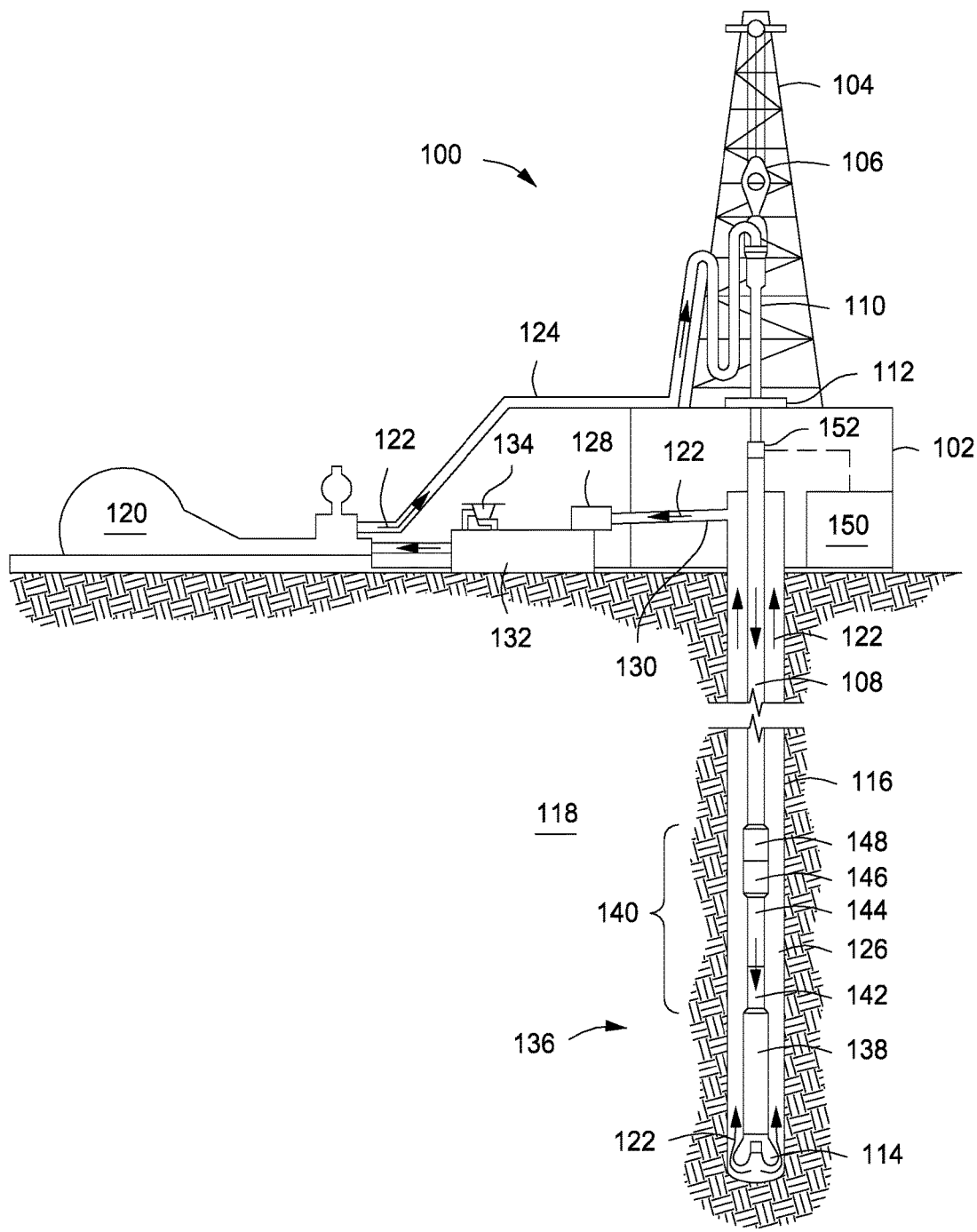
FIG. 1 illustrates an exemplary drilling system that may employ the principles of the present disclosure.

Referring to FIG. 1, illustrated is an exemplary drilling system 100 that may employ the principles of the present disclosure. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. As illustrated, the drilling system 100 may include a drilling platform 102 that supports a derrick 104 having a traveling block 106 for raising and lowering a drill string 108. The drill string 108 may include, but is not limited to, drill pipe or coiled tubing, as generally known to those skilled in the art. A kelly 110 (or top drive system) supports the drill string 108 as it is lowered through a rotary table 112. A drill bit 114 is attached to the distal end of the drill string 108 and rotated to create a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and eventually out through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). One or more chemicals, fluids, or additives may be added to the drilling fluid 122 via a mixing hopper 134 communicably coupled to or otherwise in fluid communication with the retention pit 132.

As illustrated, the drilling system 100 may further include a bottom hole assembly (BHA) 136 arranged at or near the distal end of the drill string 108. The BHA 136 may include the drill bit 114, a downhole drilling motor or mud motor 138 operatively coupled to the drill bit 114, and a measure-while-drilling (MWD) tool 140 operatively and communicably coupled to the mud motor 138. The mud motor 138 may be configured to power and otherwise rotate the drill bit 114 during drilling operations. In some embodiments, for example, the mud motor 138 may be a turbodrill that encompasses a turbine having multiple turbine stages (not shown), where the rotors of each turbine stage are coupled to a turbine shaft that is operatively coupled to the drill bit 114. While circulating through the mud motor 138, the drilling fluid 122 acts on the rotors and thereby causes the turbine shaft to rotate and drive the drill bit 114.

The MWD tool 140 may include a pressure sensor 142, a sensor module 144, an electronics module 146, and a communications module 148. The pressure sensor 142 may be generally arranged in the BHA 136 uphole or otherwise above the mud motor 138 and, as will be discussed in greater detail below, configured to detect pressure pulses or fluctuations generated by the mud motor 138 during operation. The pressure sensor 142 may be any type of fluid pressure sensing or detecting device known in the art. For example, the pressure sensor 142 may include, but is not limited to, piezoresistive strain gauges, capacitive sensors, electromagnetic sensors, piezoelectric sensors, optical sensors, potentiometric sensors, resonant sensors, or any combination thereof. In at least one embodiment, the pressure sensor 142 may be a pressure management while drilling (PMWD) sensor. As discussed below, the pressure sensor 142 may be configured to help determine the rotational speed of the mud motor 138 (and therefore the drill bit 114) during operation.

The sensor module 144 may include any of a number of known sensors, devices, and/or gauges used to help a driller or well operator optimize drilling operations. For instance, the sensor module 144 may include formation evaluation sensors, directional sensors, and/or logging-while-drilling tools. These sensors and tools are generally known in the art and are therefore not described further. The electronics module 146 may include and otherwise house computational equipment, such as a computer including a processor and a machine-readable storage medium having software instructions stored thereon, which, when executed by the processor, cause the MWD tool 140 to perform a number of operations, such as obtaining downhole measurements or operating the communications module 148.

The communications module 148 may be any device or mechanism known to those skilled in the art that facilitates downhole communication with a surface location, such as a computer system 150. As depicted, the computer system 150 may be arranged at or near the drilling platform 102. In other embodiments, however, the computer system 150 may be located at a remote location and the communications module 148 may be configured to communicate wired or wirelessly with the computer system 150 at the remote location.

In at least one embodiment, the communications module 148 may be a mud pulser configured to encode and transmit data received from the MWD tool 140 via pressure pulse transmission methods discernible from any pressure pulses that may be generated by the mud motor 138 due to partial fluid blockage created as turbine blades pass over flow passages defined between angularly adjacent stator blades. Examples of such pulse transmission methods may include, but are not limited to, positive pulse, negative pulse, mud siren, and the like, wherein the pulsing characteristics are specifically selected and/or controlled, as further described below, to be discernible from the pressure pulses generated by the mud motor 138. In exemplary operation, the mud pulser induces fluid pressure fluctuations or "pulses" in the column of drilling fluid 122 within the drill string 108, and such pulses may be detected by one or more surface sensors, such as a pressure transducer 152. The pressure transducer 152 may receive and decode the pressure pulse data from the mud pulser, and communicate (either wired or wirelessly) said data to the computer system 150 communicably coupled thereto.

In other embodiments, however, the communications module 148 may be configured to communicate with the computer system 150 using any wired or wireless means of telecommunication including, but not limited to, electrical lines, fiber optic lines, radio frequency transmission, electromagnetic telemetry, acoustic telemetry, or any combination thereof.

The electronics module 146 may be communicably coupled (either wired or wirelessly) to the pressure sensor 142 and the sensor module 144. Internal software encoded in the electronics module 146 can be adapted to process the data signals received from the pressure sensor 142 and the sensor module 144. Such information may then be transmitted to the computer system 150 at the surface using the communications module 148, as described above, for operator consideration.

According to embodiments of the present disclosure, the electronics module 146 may be configured to process data signals received from the pressure sensor 142 and thereby calculate the rotational speed of the mud motor 138 (and hence the drill bit 114) at any given time. In other embodiments, however, the electronics module 146 may be configured to provide the data signals received from the pressure sensor 142 to the communications module 148, which may serve as a repeater that re-transmits the data signals from the pressure sensor 142 to the computer system 150. In such embodiments, the computer system 150 may include or otherwise incorporate suitable software used to calculate the real-time rotational speed of the mud motor 138 (and the drill bit 114). Accordingly, in such embodiments, the computer system 150 may operate as the electronics module 146 as described above.

Figure 2A:
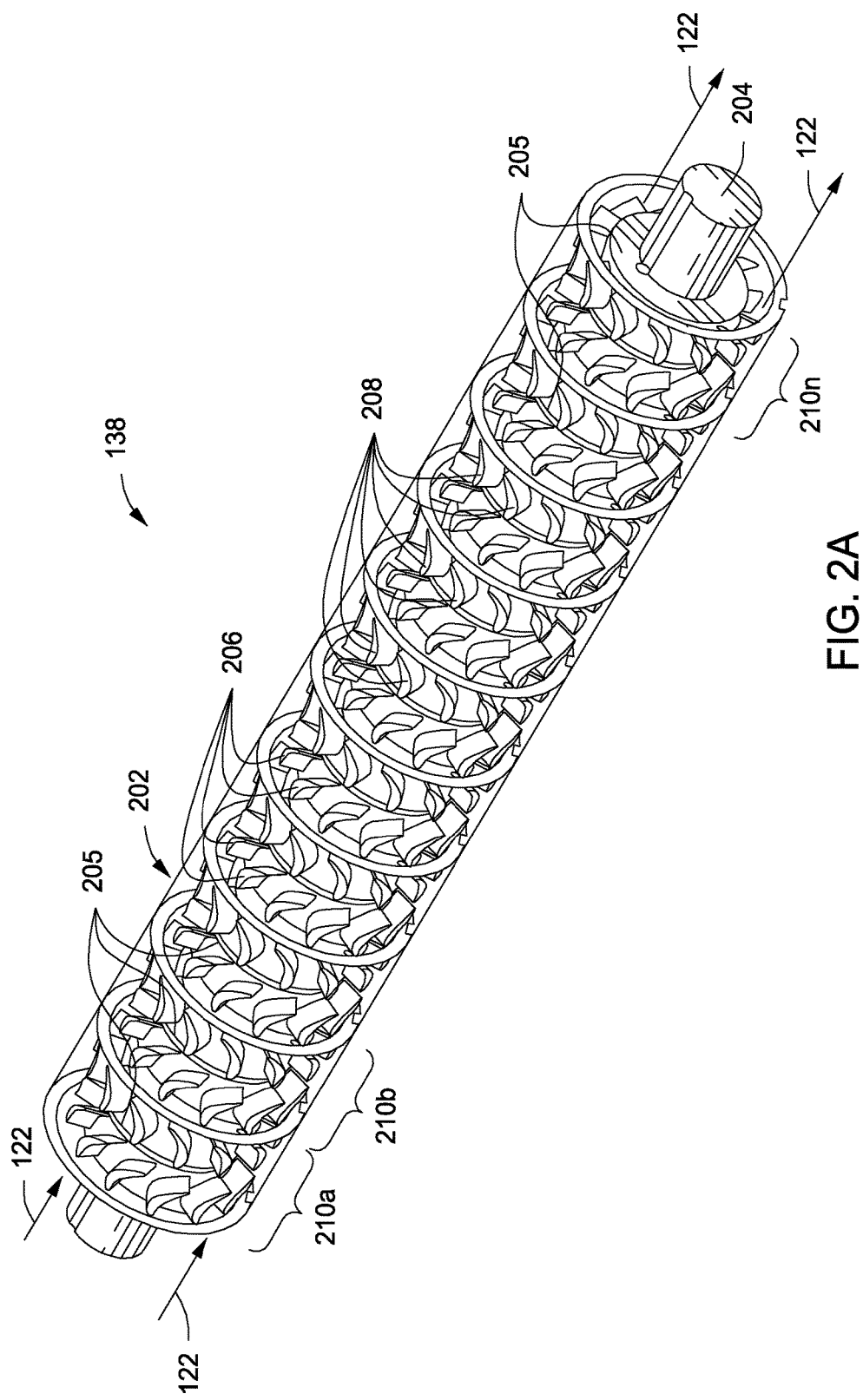
FIG. 2A illustrates an enlarged isometric view of a portion of the mud motor of FIG. 1, according to one or more embodiments of the present disclosure.

Referring now to FIG. 2A, with continued reference to FIG. 1, illustrated is an enlarged isometric view of a portion of the mud motor 138 of FIG. 1, according to one or more embodiments. As illustrated, the mud motor 138 is a turbodrill-type downhole motor that includes and otherwise encompasses a rotatable turbine adapted to power the drill bit 114 (FIG. 1). More particularly, the mud motor 138 may include a stator 202, a turbine shaft 204 rotatably arranged within the stator 202, and a plurality of rotors 205 fixedly attached to the turbine shaft 204 such that rotation of the turbine shaft correspondingly rotates the rotors 205, and vice versa. The stator 202 is shown in phantom in FIG. 2A such that the internal components of the mud motor 138 may be visible. The turbine shaft 204 extends longitudinally through the stator 202 and, while not shown, is operatively coupled to the drill bit 114 (FIG. 1) at its distal end (i.e., to the right in FIG. 2A).

In some embodiments, the stator 202 may be housed within and otherwise fixed to the inner walls of an outer housing (not shown) that is operatively coupled to the drill string 108 (FIG. 1). In other embodiments, however, the stator 202 itself may be operatively coupled to the drill string 108, without departing from the scope of the disclosure. As illustrated, the stator 202 may include a plurality of stator blades 206 extending radially inward from the inner surface of the stator 202. As depicted, several sets of stator blades 206 are arranged at numerous predetermined axial locations along the length of the stator 202. As discussed below with reference to FIG. 5, in some embodiments, the stator 202 may include a plurality of stator sections extending along the axial length of the turbine shaft 204, and each set of stator blades 206 may be associated with a corresponding one of the stator sections.

At each axial location, the stator blades 206 are angularly and equidistantly spaced about the inner circumference of the stator 202. Likewise, each rotor 205 may include a plurality of rotor blades 208 extending radially outward from the outer surface of the corresponding rotor 205. As depicted, several sets of rotors 205 and rotor blades 208 are arranged at numerous predetermined axial locations along the length of the turbine shaft 204. At each axial location, the rotor blades 208 are angularly and equidistantly spaced about the outer circumference of the corresponding rotor 205.

Axially adjacent sets of stator and rotor blades 206, 208 combine to form corresponding turbine stages 210 (shown as turbine stages 210a, 210b, . . . and 210n) axially aligned along the length of the mud motor 138. While a certain number of turbine stages 210a-n are depicted in FIG. 2A, those skilled in the art will readily appreciate that more or less turbine stages 210a-n may be employed in the mud motor 138, without departing from the scope of the disclosure. Indeed, the mud motor 138 may include between about 80 and about 150 turbine stages 210a-n in accordance with the present disclosure. However, it will be appreciated that less than 80 stages or more than 150 stages may be employed in the mud motor 138, without departing from the scope of the disclosure.

Figure 2B:
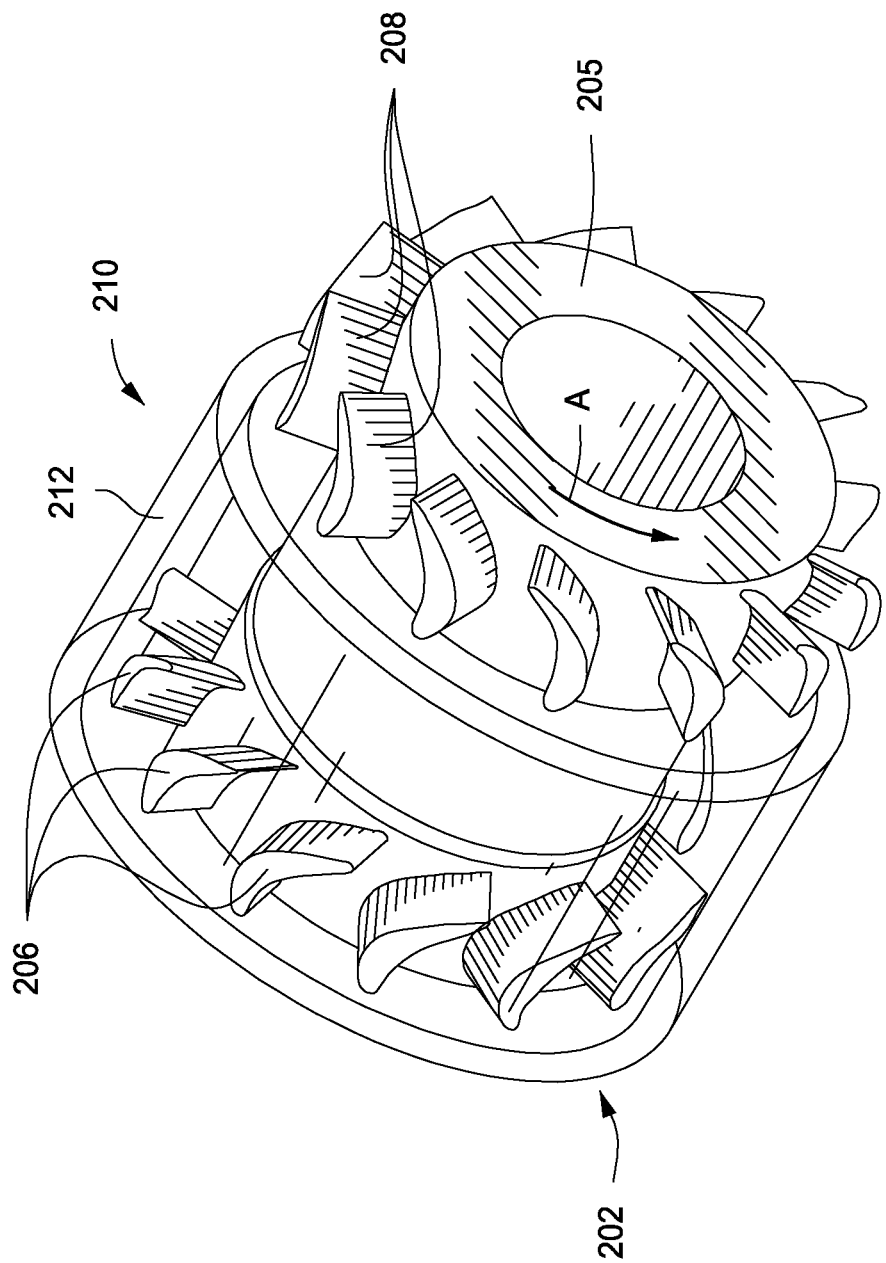
FIG. 2B illustrates an enlarged isometric view of one stage of the mud motor of FIG. 2A, according to one or more embodiments of the present disclosure.

Referring briefly to FIG. 2B, illustrated is an enlarged isometric view of an exemplary turbine stage 210, according to one or more embodiments. More particularly, FIG. 2B depicts a single stator section 212 and corresponding set of stator blades 206, and a single rotor 205 associated therewith. The turbine stage 210 is also shown in FIG. 2B as being partially exploded, where the rotor 205 is depicted as axially offset from the stator section 212 and otherwise extended at least partially out of the stator 202. Similar to FIG. 2A, the stator 202 is shown in phantom in FIG. 2B so that the internal components of the turbine stage 210 are visible. The turbine shaft 204 (FIG. 2A) is also omitted from FIG. 2B, but the rotor 205 would otherwise be fixedly attached thereto, as generally described above.

During operation, a fluid (e.g., the drilling fluid 122 of FIG. 1) is received by the stator blades 206, which change the direction of the fluid and direct it into the axially adjacent rotor blades 208. The resulting impulse of fluid energy impacting the rotor blades 208 urges the rotor 205 to rotate in a first direction A, which, in turn, correspondingly urges the turbine shaft 204 (FIG. 2A) to rotate in the same direction A. The fluid exits the turbine stage 210 with diminished kinetic energy and may then enter an axially adjacent and downhole turbine stage 210 (not shown), or otherwise be conveyed to the drill bit 114 (FIG. 1), as generally described above.

Referring again to FIG. 2A, exemplary operation of the mud motor 138 is now provided, according to one or more embodiments. In exemplary operation, the drilling fluid 122 is conveyed under pressure to the mud motor 138 via the drill string 108 (FIG. 1). Once reaching the mud motor 138, the drilling fluid 122 enters the first turbine stage 210a and acts on the rotor 205 of the first turbine stage 210a, thereby causing the rotor 205 and the turbine shaft 204 to rotate. The drilling fluid 122 then flows out of the first turbine stage 210a and enters the second turbine stage 210b, where the drilling fluid 122 acts on the rotor 205 of the second turbine stage 210b and causes the rotor 205 and the turbine shaft 204 to rotate. This process continues until the drilling fluid 122 eventually passes through the $n^{th}$ turbine stage 210n and is thereafter conveyed to the drill bit 114 (FIG. 1) where it is ejected out of the drill bit 114 and recirculated back to the drilling platform 102 (FIG. 1) for reconditioning.

Rotating the turbine shaft 204 correspondingly results in the rotation of the drill bit 114 (FIG. 1) operatively coupled to its distal end. Accordingly, the flow energy exhibited by the drilling fluid 122 is converted to mechanical energy received by the turbine shaft 204 in the form of rotational speed and torque. The actual rotational speed of the drill bit 114 may be dependent on several factors including, but not limited to, the torque generated at the drill bit 114 as it contacts the surrounding formation 118 (FIG. 1), the type of rock being cut through in the formation 118, the type of drill bit 114 being used, and the flow rate of the drilling fluid 122 through the mud motor 138.

The relationship between the flow energy of the drilling fluid 122 at a given flow rate and the output mechanical power received by the drill bit 114 is generally governed by the following equations:

$$\text{Total Pressure Drop} \times \text{Flow} \times \text{Efficiency} = \text{Torque} \times \text{Speed} \quad \text{Equation (1)}$$

$$\text{\# of Turbine Stages} \times \text{Stage Pressure Drop} \times \text{Flow} \times \text{Efficiency} = \text{Torque} \times \text{Speed} \quad \text{Equation (2)}$$

$$\text{Speed} \propto \text{Stage Pressure Drop} \quad \text{Equation (3)}$$

The efficiency of converting the fluid energy of the drilling fluid 122 into mechanical energy is governed by a number of factors including fluid friction and leakage losses, both of which tend to increase with the pressure drop per turbine stage 210a-n. A higher pressure drop per turbine stage 210a-n may be indicative of higher flow velocities and hence higher rates of erosion and wear. It is usually desirable by drillers and well operators to limit the rotational speed of the drill bit 114 to within a range that does not result in excessive wear or damage to the structure of the drill bit 114. Therefore, it may be advantageous to limit the pressure drop in each turbine stage 210a-n. Consequently, to attain the levels of power and torque required to drive the drill bit 114 and achieve acceptable rates of drilling penetration, it may be necessary to have a large number of turbine stages 210a-n in the mud motor 138.

According to the present disclosure, the rotational speed of the drill bit 114 may be determined by detecting or otherwise sensing pressure pulses or fluctuations generated by operation of the mud motor 138 as the drilling fluid 122 circulates therethrough. More particularly, as the rotors 205 rotate relative to the stator 202 and its associated blades 206, the rotor blades 208 continuously pass across flow passages defined between angularly adjacent stator blades 206, thereby resulting in a slight disturbance (e.g., a pressure increase) in the fluid flow and the generation of a small fluctuation in the pressure at the inlet to the subsequent turbine stage 210*a-n*. This pressure disturbance will fluctuate at a frequency that is related to the rotational speed of the rotor 205 relative to the stator 202, multiplied by the number of flow passages defined between angularly adjacent stator blades 206 in the stator 202. This is commonly referred to as the "blade passing frequency" of the particular turbine stage 210*a-n*.

Figure 3B:
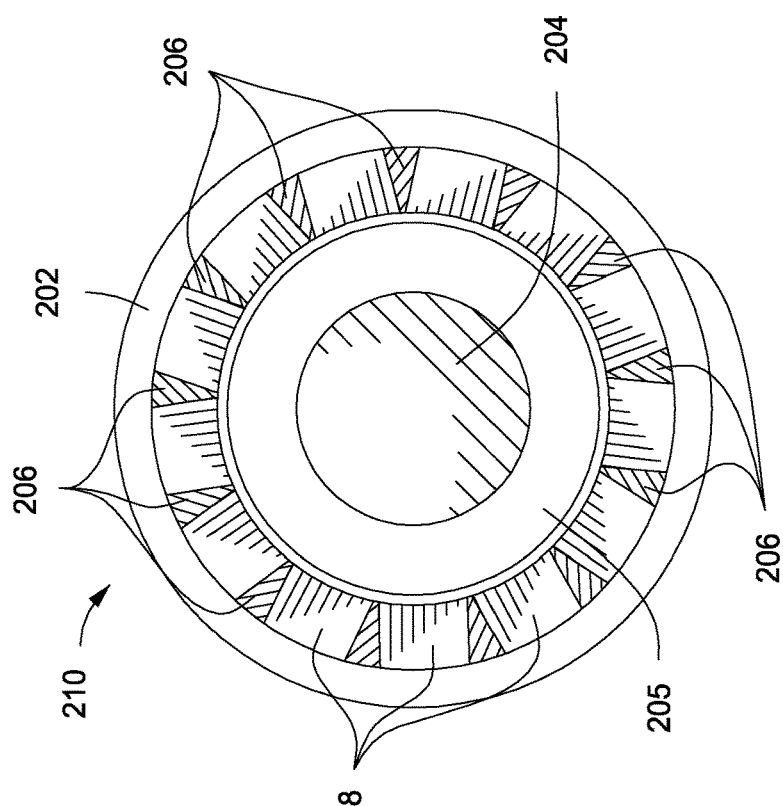
FIGS. 3A and 3B illustrate progressive axial end views of an exemplary turbine stage, according to one or more embodiments.
Figure 3A:
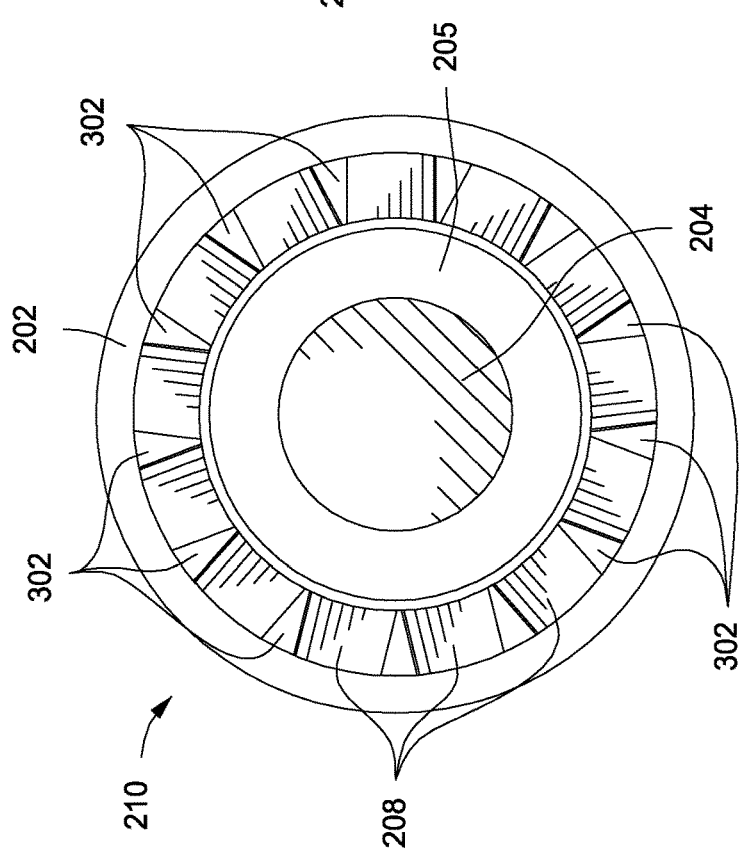

This effect is illustrated in FIGS. 3A and 3B, which depict progressive axial end views of an exemplary turbine stage 210, according to one or more embodiments. As illustrated, the turbine stage 210 includes the stator 202, the turbine shaft 204, and a rotor 205 fixedly attached to the turbine shaft 204. In FIG. 3A, the rotor blades 208 are generally aligned axially with the stator blades 206, such that a plurality of flow passages 302 are exposed through the turbine stage 210. In FIG. 3B, however, the rotor 205 has rotated a small angular distance such that the rotor blades 208 become axially misaligned with the stator blades 206 and generally block the flow passages 302 through the turbine stage 210. As the rotor 205 rotates, the rotor blades 208 repeatedly and sequentially block and unblock the flow passages 302, thereby generating a series of small pressure fluctuations or pulses that propagate uphole in the flow of the drilling fluid 122.

The term "block" or "blocking" as used herein in conjunction with the rotor blades 208 and the flow passages 302 does not mean that the rotor blades 208 occlude the flow passages 302 such that fluid flow therethrough is wholly prevented. Rather, as will be appreciated, the flow passages 302 are only partially blocked by the rotor blades 208 in the position depicted in FIG. 3B since, as can readily be seen in FIGS. 2A and 2B, there remains a longitudinal flow path or space that extends between axially adjacent stator and rotor blades 206, 208. Consequently, the pressure variation caused by the rotor blades 208 becoming axially misaligned with the stator blades 206, and thereby blocking the flow passages 302 through the turbine stage 210, may only be a few percent of the nominal value. Nonetheless, the blockage of the flow passages 302 may result in the generation and propagation of a detectable pressure pulse in the fluid column uphole from the particular turbine stage 210.

In conventional turbine construction, the turbine components are generally mounted to the turbine shaft in a random orientation from one turbine stage to the next. As a result, in any given time the relative position of the rotor and stator of one turbine stage may be as shown in FIG. 3A, while the relative position of the rotor and stator of another turbine stage may be as shown in FIG. 3B, or at some intermediate position therebetween. Consequently, the peak pressure variation or fluctuation for each turbine stage generally occurs at random intervals along the axial length of the turbine shaft in conventional turbines, thereby effectively damping out the generated pressure pulses.

According to the present disclosure, however, and with reference again to FIGS. 1 and 2A, the pressure pulses generated by the turbine stages 210*a-n* of the mud motor 138 may be amplified and otherwise magnified by angularly aligning some or all of the turbine stages 210*a-n*. The combined and amplified pressure pulses generated by the angularly aligned turbine stages 210*a-n* may then be readily detectable with the pressure sensor 142 and subsequently processed in order to determine the real-time rotational speed of the mud motor 138 (and hence the speed of the drill bit 114).

More particularly, at least two of the turbine stages 210*a-n* in the mud motor 138 may be angularly aligned along the turbine shaft 204 in order coordinate and amplify the respective pressure pulses generated therefrom during operation. For example, the first turbine stage 210*a* may be angularly aligned with the second turbine stage 210*b* along the turbine shaft 204 such that the stator blades 206 of each turbine stage 210*a,b* are axially aligned with each other, and the rotor blades 208 of each turbine stage 210*a,b* are axially aligned with each other and therefore rotate together. As the corresponding rotors 205 rotate during operation, the flow passages 302 through the respective turbine stages 210*a,b* are therefore blocked and unblocked at generally the same time, thereby simultaneously generating a series of combined pressure pulses that can be detected or otherwise sensed by the pressure sensor 142. As will be appreciated, the combined pressure pulses may be magnified even further by angularly aligning additional turbine stages 210*a-n* with the first and second turbine stages 210*a,b* along the turbine shaft 204.

Upon sensing the pressure pulses generated by the first and second turbine stages 210*a-n* (and any additional turbine stages 210*a-n* angularly aligned therewith), the pressure sensor 142 may be configured to communicate the same to the electronics module 146 for processing. More particularly, the frequency of the pressure pulses detected by the pressure sensor 142 may be used to determine the rotational speed of the turbine shaft 204, and therefore the speed of the drill bit 114. This may be determined using software employed by the electronics module 146 with the following equation:

$$\text{Drill Bit Speed} = \frac{\text{Detected Frequency}}{\text{\# of Flow Passages}} \times 60 \text{ rpm} \qquad \text{Equation (4)}$$

Once the real-time speed of the drill bit 114 is calculated, it can be transmitted to the surface using the communications module 148, as generally described above. The data may be received at the computer system 150 and provided to a drilling or well operator for consideration. As a result, the driller or well operator may be apprised in real-time of the actual speed of the drill bit 114 as measured downhole, and may therefore make appropriate adjustments to the drilling process, if needed.

In embodiments where the communications module 148 is a mud pulser, as generally described above, the pressure pulses transmitted by the mud pulser to the pressure transducer 152 may be selected and/or controlled to be discernible from the pressure pulses generated by the mud motor 138. In some embodiments, for example, the pressure pulses transmitted by the mud pulser to the pressure transducer 152 may be in a frequency spectrum that is different from the frequency spectrum of the pressure pulses generated by the mud motor 138. For instance, transmission frequency of the pressure pulses generated by the mud pulser (i.e., the communications module 148) may be much higher than the frequency of the pressure pulses generated by the mud motor 138. This may be accomplished, in at least one embodiment, by basing the mud pulser pressure pulses on a frequency shift method, such as continuous wave modulation or the like, which would be configured in a different frequency range from the mud motor 138 pressure pulses. As will be appreciated, this makes it possible for the pressure transducer 152 to separate pressure pulses potentially received from both the mud pulser and the mud motor 138 and may prove advantageous in mitigating or otherwise preventing disturbing influences on the pressure transducer 152. In other embodiments, however, the same effect may be accomplished by transmitting the pressure pulses in different pulse amplitudes or magnitudes or within a defined or distinct band range, without departing from the scope of the disclosure.

As will be appreciated, arranging the pressure sensor 142 close to the mud motor 138, and thereby measuring the pressure pulses generated by the mud motor 138 within a relatively close distance thereof, makes it more likely that the speed of the drill bit 114 can be accurately detected from the magnitude of the pressure pulses. This may, in turn, greatly simplify the analysis and processing of the data. In the event the magnitude of the resulting pressure pulses from the mud motor 138 are not readily detectable, however, the electronics module 146 may be configured to apply known Fourier frequency data analysis techniques and thereby isolate discrete frequencies and, hence, isolate the frequencies related to the rotational speed of the mud motor 138.

In yet other embodiments, as discussed more below, the pressure pulses generated by the mud motor 138 may be large enough to be detected at the surface with the pressure transducer 152. In such embodiments, the pressure sensor 142 may be omitted from the BHA 136, and the necessary processing of the data signals to obtain the real-time rotational speed of the mud motor 138 may be undertaken by the computer system 150 at the surface, without departing from the scope of the disclosure. In such embodiments, the computer system 150 may operate as the electronics module 146 in processing the pressure pulse signals received from the pressure sensor 142 and determining a rotational speed of the mud motor 138.

Figure 4:
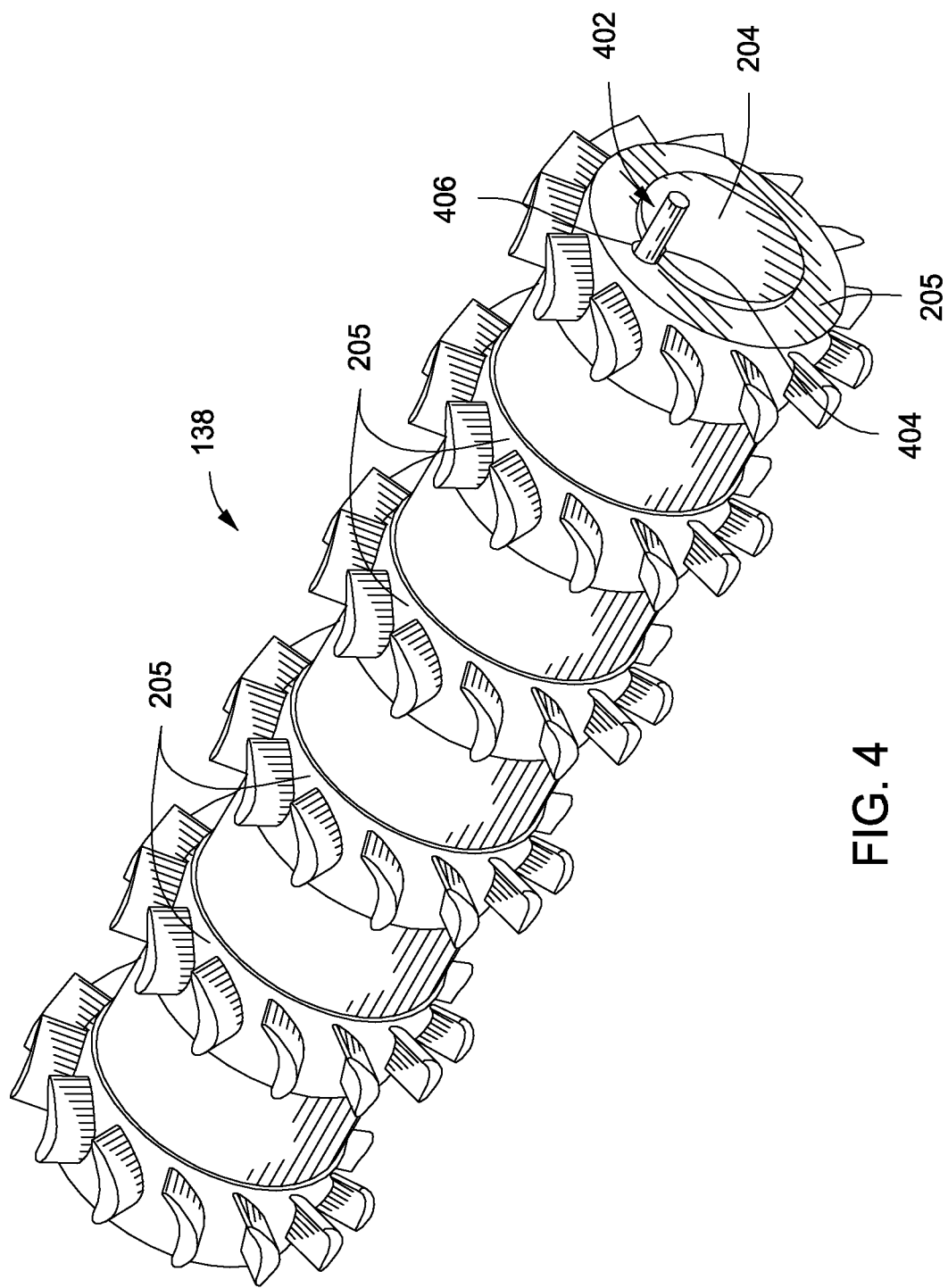
FIG. 4 illustrates an isometric view of a portion of the mud motor of FIG. 2A, according to one or more embodiments.

Referring now to FIG. 4, with continued reference to the previous figures, illustrated is an isometric view of a portion of the mud motor 138, according to one or more embodiments. More particularly, FIG. 4 depicts a plurality of rotors 205 axially arranged on the turbine shaft 204 and angularly aligned with each other, in accordance with the present disclosure. As illustrated, the mud motor 138 may include a longitudinal locating pin 402 that may be used to angularly align the rotors 205 on the turbine shaft 204. In some embodiments, a longitudinal shaft channel 404 may be defined in the turbine shaft 204, and the rotors 205 may each have a longitudinal rotor channel 406 defined therein. Upon angularly aligning the longitudinal shaft and rotor channels 404, 406, the longitudinal locating pin 402 may be inserted into the hole cooperatively defined thereby to rotationally fix each rotor 205 along the length of the turbine shaft 204.

In other embodiments, however, the longitudinal shaft channel 404 may be omitted and the longitudinal locating pin 402 may instead form an integral part of turbine shaft 204. In such embodiments, the longitudinal locating pin 402 may be inserted into the longitudinal rotor channel 406 defined in the rotors 205, and thereby angularly align the corresponding rotors 205. In yet other embodiments, the longitudinal rotor channels 406 may be omitted and the longitudinal locating pin 402 may instead form an integral part of the rotors 205. In such embodiments, the rotors 205 may be angularly adjusted such that the longitudinal locating pin(s) 402 defined on each rotor 205 may be inserted into the longitudinal shaft channel 404 defined in the turbine shaft 204, and thereby angularly align the corresponding rotors 205. As indicated above, angularly aligning several rotors 205 (i.e., more than two) may prove advantageous in magnifying or amplifying the combined pressure pulse detectable by the pressure sensor 142.

Figure 5:
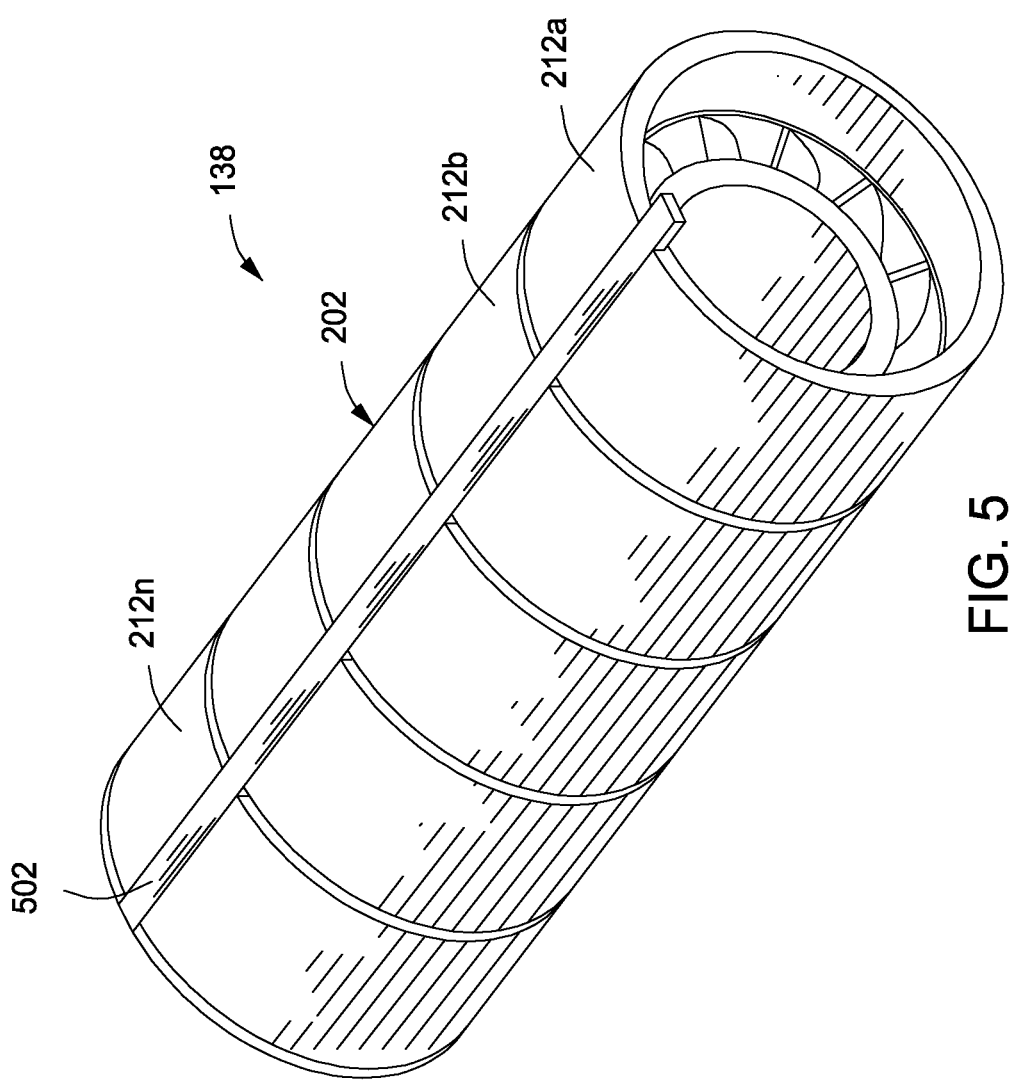
FIG. 5 illustrates an isometric view of a portion of the mud motor of FIG. 2A, according to one or more embodiments.

Referring now to FIG. 5, with continued reference to the previous figures, illustrated is another isometric view of a portion of the mud motor 138, according to one or more embodiments. More particularly, FIG. 5 depicts the angular alignment of the stator 202 (shown as stator sections 212a, 212b, . . . 212n), in accordance with the present disclosure. As depicted, the mud motor 138 may include a stator alignment strip 212 and two or more of the stator sections 212a-n may each have a stator channel 504 defined therein and configured to receive the stator alignment strip 502. By receiving the stator alignment strip 502, the corresponding stator sections 212a-n may be angularly aligned such that axially adjacent stator blades 206 become axially aligned. As a result, the pressure pulses generated by axially adjacent turbine stages 210a-n may be magnified or otherwise amplified.

In some embodiments, several stator sections 212a-n and radially adjacent rotors 210a-n (FIG. 2A) may each be angularly aligned such that increased or magnified pressure pulses are generated by the mud motor 138. In at least one embodiment, the combined angular alignment of the stator sections 212a-n and radially adjacent rotors 210a-n may result in the generation of pressure pulses that are large enough to be detected at the surface, such as with the pressure transducer 152 (FIG. 1). In such embodiments, this may prove useful in potentially eliminating the need for downhole equipment to receive, decode and transmit the pressure pulses from the mud motor 138. The pressure transducer 152 may be configured with appropriate sensitivity in relation to signal to noise ratios, as is already well known in the art. In some embodiments, however, the signal detected and otherwise received by the pressure transducer 152 may be conveyed to the computer system 150, which may apply one or more signal frequency filtering and noise elimination techniques, as already well known in the art.

It is recognized that the various embodiments herein directed to computer control and/or artificial neural networks, including various blocks, modules, elements, components, methods, and algorithms, can be implemented using computer hardware, software, combinations thereof, and the like. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any non-transitory medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. A drilling system that includes a drill bit arranged at a distal end of a drill string that conveys a drilling fluid to the drill bit, a mud motor arranged in the drill string and having a turbine shaft operatively coupled to the drill bit and a plurality of turbine stages axially arranged along a portion of the turbine shaft, each turbine stage comprising a plurality of stator blades extending radially inward from a stator and a plurality of rotor blades extending radially outward from a rotor fixedly attached to the turbine shaft, the rotor being configured to rotate with respect to the corresponding plurality of stator blades upon receiving the drilling fluid, a measure-while-drilling (MWD) tool operatively and communicably coupled to the mud motor and including a pressure sensor configured to detect pressure pulses generated by the mud motor and generate data signals corresponding to the pressure pulses, an electronics module communicably coupled to the pressure sensor and configured to process the data signals and thereby calculate a rotational speed of the mud motor, and a communications module communicably coupled to the electronics module and configured to transmit signals indicative of the rotational speed of the mud motor to a surface location.

B. A method that includes conveying a drilling fluid through a drill string, the drill string having a drill bit arranged at a distal end thereof, introducing the drilling fluid into a mud motor arranged on the drill string, the mud motor having a turbine shaft operatively coupled to the drill bit and a plurality of turbine stages axially arranged along a portion of the turbine shaft, each turbine stage comprising a plurality of stator blades extending radially inward from a stator and a plurality of rotor blades extending radially outward from a rotor fixedly attached to the turbine shaft, rotating the plurality of rotor blades with the drilling fluid and thereby generating pressure pulses with the mud motor as the plurality of rotor blades rotates past a corresponding plurality of stator blades and repeatedly blocks and unblocks a plurality of flow passages defined between angularly adjacent stator blades, detecting the pressure pulses with a pressure sensor arranged within a measure-while-drilling (MWD) tool operatively and communicably coupled to the mud motor, generating data signals corresponding to the pressure pulses with the pressure sensor, receiving and processing the data signals with an electronics module and thereby calculating a rotational speed of the mud motor, and transmitting signals indicative of the rotational speed of the mud motor to a surface location with a communications module communicably coupled to the electronics module.

C. A drilling system that includes a drill bit arranged at a distal end of a drill string configured to convey a drilling fluid to the drill bit, a mud motor arranged on the drill string and having a turbine shaft operatively coupled to the drill bit, a plurality of turbine stages axially arranged along a portion of the turbine shaft, each turbine stage comprising a plurality of stator blades extending radially inward from a stator and a plurality of rotor blades extending radially outward from a rotor fixedly attached to the turbine shaft, the rotor being configured to rotate with respect to the plurality of stator blades upon receiving the drilling fluid, wherein at least two turbine stages are angularly aligned with each other on the turbine shaft, a pressure transducer arranged at a surface location and configured to detect pressure pulses generated by the mud motor and generate data signals corresponding to the pressure pulses, and a computer system communicably coupled to the pressure transducer and configured to process the data signals and thereby calculate a rotational speed of the mud motor.

Each of embodiments A, B, and C may have one or more of the following additional elements in any combination: Element 1: wherein the pressure pulses generated by the mud motor are generated as the drilling fluid rotates the plurality of rotor blades past the corresponding plurality of stator blades and repeatedly blocks and unblocks a plurality of flow passages defined between angularly adjacent stator blades. Element 2: further comprising a computer system arranged at the surface location and configured to receive the signals indicative of the rotational speed of the mud motor. Element 3: wherein the communications module communicates with the computer system via at least one of electrical lines, fiber optic lines, radio frequency transmission, electromagnetic telemetry, and acoustic telemetry. Element 4: wherein the communications module is a mud pulser configured to transmit the signals in the form of drilling fluid pressure pulses, the drilling system further comprising a pressure transducer arranged at the surface location and communicably coupled to the computer system, the pressure transducer being configured to detect the drilling fluid pressure pulses. Element 5: wherein the mud pulser transmits the drilling fluid pressure pulses at a frequency different than a frequency of the pressure pulses generated by the mud motor. Element 6: wherein the pressure sensor is at least one of a piezoresistive strain gauge, a capacitive sensor, an electromagnetic sensor, a piezoelectric sensor, an optical sensor, a potentiometric sensor, and a resonant sensor. Element 7: wherein two or more of the plurality of turbine stages are angularly aligned along the turbine shaft such that the plurality of stator blades of the two or more turbine stages are axially aligned with each other, and the plurality of rotor blades of the two or more turbine stages are axially aligned with each other and therefore rotate together. Element 8: further comprising a longitudinal locating pin used to secure and angularly align the rotors of at least two of the turbine stages on the turbine shaft. Element 9: wherein the stator comprises a plurality of stator sections, each stator section having a stator channel defined therein, the drilling system further comprising a stator alignment strip receivable within the stator channel of each stator section to angularly align the plurality of stator sections.

Element 10: further comprising receiving the signals indicative of the rotational speed of the mud motor with a computer system arranged at the surface location. Element 11: wherein the communications module is a mud pulser, the method further comprising transmitting the signals with the mud pulser as drilling fluid pressure pulses, and detecting the drilling fluid pressure pulses with a pressure transducer arranged at the surface location and communicably coupled to the computer system. Element 12: further comprising transmitting the drilling fluid pressure pulses with the mud pulser at a frequency different than a frequency of the pressure pulses generated by the mud motor. Element 13: further comprising angularly aligning two or more of the plurality of turbine stages such that the plurality of stator blades of the two or more turbine stages are axially aligned with each other and the plurality of rotor blades of the two or more turbine stages are axially aligned with each other and therefore rotate together, and amplifying the pressure pulses generated by the mud motor with the two or more of the plurality of turbine stages as angularly aligned. Element 14: wherein the stator comprises a plurality of stator sections, each stator section having a stator channel defined therein, and wherein angularly aligning the two or more of the plurality of turbine stages comprises angularly aligning the rotors of the two or more of the plurality of turbine stages on the turbine shaft using a longitudinal locating pin, and angularly aligning the plurality stator sections with a stator alignment strip receivable within the stator channel of each stator section.

Element 15: wherein the at least two turbine stages are angularly aligned on the turbine shaft such that the plurality of stator blades of the at least two turbine stages are axially aligned with each other, and the plurality of rotor blades of the at least two turbine stages are axially aligned with each other and therefore rotate together. Element 16: wherein the pressure pulses generated by the mud motor are generated as the drilling fluid rotates the plurality of rotor blades of the at least two turbine stages past the plurality of stator blades of the at least two turbine stages and repeatedly blocks and unblocks a plurality of flow passages defined between angularly adjacent stator blades. Element 17: further comprising a longitudinal locating pin used to secure and angularly align the rotors of the at least two turbine stages on the turbine shaft. Element 18: wherein the stator comprises a plurality of stator sections, each stator section having a stator channel defined therein, the drilling system further comprising a stator alignment strip receivable within the stator channel of each stator section of the at least two turbine stages to angularly align the stator sections of the at least two turbine stages.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A drilling system, comprising:
   a drill bit arranged at a distal end of a drill string configured to convey a drilling fluid to the drill bit;
   a mud motor arranged in the drill string and having a turbine shaft operatively coupled to the drill bit and a plurality of turbine stages axially arranged along a portion of the turbine shaft, each turbine stage comprising a plurality of stator blades and a plurality of rotor blades configured to rotate with respect to the plurality of stator blades in response to movement of the drilling fluid, wherein two or more turbine stages of the plurality of turbine stages are angularly aligned along the turbine shaft to permit the plurality of stator blades of the two or more turbine stages to be axially aligned with each other and the plurality of rotor blades of the two or more turbine stages to be axially aligned with each other, wherein each stator blade of the two or more turbine stages is configured to change a direction of the drilling fluid and direct the drilling fluid into axially adjacent rotor blades, wherein each rotor blade of the two or more turbine stages is configured to receive the drilling fluid from axially adjacent stator blades and urge the turbine shaft to rotate in response to receiving the drilling fluid, and wherein the mud motor is configured to generate pressure pulses as the drilling fluid rotates the plurality of rotor blades past the plurality of stator blades of the two or more turbine stages and repeatedly blocks and unblocks a plurality of flow passages defined between angularly adjacent stator blades of the two or more turbine stages;

a measure-while-drilling (MWD) tool coupled to the mud motor and including a pressure sensor configured to detect the pressure pulses generated by the mud motor and generate data signals corresponding to the pressure pulses;

an electronics module communicably coupled to the pressure sensor and configured to process the data signals and thereby calculate a rotational speed of the mud motor; and a communications module communicably coupled to the electronics module and configured to transmit signals indicative of the rotational speed of the mud motor to a surface location.

2. The drilling system of claim 1, further comprising a computer system arranged at the surface location and configured to receive the signals indicative of the rotational speed of the mud motor.

3. The drilling system of claim 2, wherein the communications module is configured to communicate with the computer system via at least one of electrical lines, fiber optic lines, radio frequency transmission, electromagnetic telemetry, and acoustic telemetry.

4. The drilling system of claim 2, wherein the communications module is a mud pulser configured to transmit the signals in the form of drilling fluid pressure pulses discernible from the pressure pulses generated by the mud motor.

5. The drilling system of claim 4, wherein the mud pulser is configured to transmit the drilling fluid pressure pulses at a frequency different than a frequency of the pressure pulses generated by the mud motor.

6. The drilling system of claim 1, wherein the pressure sensor is at least one of a piezoresistive strain gauge, a capacitive sensor, an electromagnetic sensor, a piezoelectric sensor, an optical sensor, a potentiometric sensor, and a resonant sensor.

7. The drilling system of claim 1, wherein each rotor blade extends radially outward from a rotor fixedly attached to the turbine shaft, the drilling system further comprising a longitudinal locating pin used to secure and angularly align the rotors of at least two of the turbine stages on the turbine shaft.

8. The drilling system of claim 1, wherein each stator blade extends radially inward from a stator that comprises a plurality of stator sections, each stator section having a stator channel defined therein, the drilling system further comprising a stator alignment strip receivable within the stator channel of each stator section to angularly align the plurality of stator sections.

9. A method, comprising:
conveying a drilling fluid through a drill string, the drill string having a drill bit arranged at a distal end thereof;

introducing the drilling fluid into a mud motor arranged on the drill string, the mud motor having a turbine shaft operatively coupled to the drill bit and a plurality of turbine stages axially arranged along a portion of the turbine shaft, each turbine stage comprising a plurality of stator blades and a plurality of rotor blades, wherein two or more of the plurality of turbine stages are angularly aligned along the turbine shaft to permit the plurality of stator blades of the two or more turbine stages to be axially aligned with each other and the plurality of rotor blades of the two or more turbine stages to be axially aligned with each other;

changing a direction of the drilling fluid with each stator blade of the two or more turbine stages to direct the drilling fluid into axially adjacent rotor blades;

receiving the drilling fluid with each rotor blade of the two or more turbine stages from axially adjacent stator blades to urge the turbine shaft to rotate in response to receiving the drilling fluid;

generating pressure pulses with the mud motor as the drilling fluid rotates the plurality of rotor blades past the plurality of stator blades of the two or more turbine stages and repeatedly blocks and unblocks a plurality of flow passages defined between angularly adjacent stator blades of the two or more turbine stages;

detecting the pressure pulses with a pressure sensor arranged within a measure-while-drilling (MWD) tool coupled to the mud motor;

generating data signals corresponding to the pressure pulses with the pressure sensor;

receiving and processing the data signals with an electronics module and thereby calculating a rotational speed of the mud motor; and transmitting signals indicative of the rotational speed of the mud motor to a surface location with a communications module communicably coupled to the electronics module.

10. The method of claim 9, further comprising receiving the signals indicative of the rotational speed of the mud motor with a computer system arranged at the surface location.

11. The method of claim 10, wherein the communications module is a mud pulser, the method further comprising:
transmitting the signals with the mud pulser as drilling fluid pressure pulses; and
detecting the drilling fluid pressure pulses with a pressure transducer arranged at the surface location and communicably coupled to the computer system.

12. The method of claim 11, further comprising transmitting the drilling fluid pressure pulses at a frequency different than a frequency of the pressure pulses generated by the mud motor.

13. The method of claim 10, further comprising:
angularly aligning the two or more turbine stages; and
amplifying the pressure pulses generated by the mud motor with the two or more turbine stages as angularly aligned.

14. The method of claim 13, wherein each stator blade extends radially inward from a stator that comprises a plurality of stator sections, each stator section having a stator channel defined therein, wherein each rotor blade extends radially outward from a rotor fixedly attached to the turbine shaft, and wherein angularly aligning the two or more turbine stages comprises:
angularly aligning the rotors of the two or more turbine stages on the turbine shaft using a longitudinal locating pin; and angularly aligning the plurality of stator sections with a stator alignment strip receivable within the stator channel of each stator section.

15. A drilling system, comprising:
a drill bit arranged at a distal end of a drill string configured to convey a drilling fluid to the drill bit;
a mud motor arranged on the drill string and having a turbine shaft operatively coupled to the drill bit;
a plurality of turbine stages axially arranged along a portion of the turbine shaft, each turbine stage comprising a plurality of stator blades and a plurality of rotor blades configured to rotate with respect to the plurality of stator blades in response to movement of the drilling fluid, wherein at least two turbine stages of the plurality of turbine stages are angularly aligned with each other on the turbine shaft to permit the plurality of stator blades of the at least two turbine stages to be axially aligned with each other and the plurality of rotor blades of the at least two turbine stages to be axially aligned with each other, wherein each stator blade of the at least two turbine stages is configured to change a direction of the drilling fluid and direct the drilling fluid into axially adjacent rotor blades, wherein each rotor blade of the at least two turbine stages is configured to receive the drilling fluid from axially adjacent stator blades and urge the turbine shaft to rotate in response to receiving the drilling fluid, and wherein the mud motor is configured to generate pressure pulses as the drilling fluid rotates the plurality of rotor blades past the plurality of stator blades of the at least two turbine stages and repeatedly blocks and unblocks a plurality of flow passages defined between angularly adjacent stator blades of the at least two turbine stages;
a pressure transducer arranged at a surface location and configured to detect the pressure pulses generated by the mud motor and generate data signals corresponding to the pressure pulses; and
a computer system communicably coupled to the pressure transducer and configured to process the data signals and thereby calculate a rotational speed of the mud motor.

16. The drilling system of claim 15, wherein each rotor blade extends radially outward from a rotor fixedly attached to the turbine shaft, the drilling system further comprising a longitudinal locating pin used to secure and angularly align the rotors of the at least two turbine stages on the turbine shaft.

17. The drilling system of claim 15, wherein each stator blade extends radially inward from a stator that comprises a plurality of stator sections, each stator section having a stator channel defined therein, the drilling system further comprising a stator alignment strip receivable within the stator channel of each stator section of the at least two turbine stages to angularly align the stator sections of the at least two turbine stages.

* * * * *